United States Patent [19]

Heise et al.

[11] Patent Number: 5,663,290

[45] Date of Patent: Sep. 2, 1997

US005663290A

[54] PROCESS FOR CRYSTALLIZATION OF POLY(ETHYLENENAPHTHALENEDI-CARBOXYLATE)

[75] Inventors: William Herbert Heise; Joseph Franklin Knight; Michael Alan Williams; Earl Edmondson Howell, Jr., all of Kingsport, Tenn.

[73] Assignee: Eastman Chemical Company, Kingsport, Tenn.

[21] Appl. No.: 505,429

[22] Filed: Jul. 21, 1995

[51] Int. Cl.$^6$ ..................................................... C08F 6/00
[52] U.S. Cl. .................. 528/481; 528/298; 528/300; 528/301; 528/302; 528/303; 528/306; 528/307; 528/308; 528/308.6; 528/492; 528/502 R; 528/503
[58] Field of Search ......................................... 528/298, 300, 528/301, 302, 303, 306, 307, 308, 308.6, 481, 492, 502, 503

[56] References Cited

U.S. PATENT DOCUMENTS

| | | | |
|---|---|---|---|
| 3,960,817 | 6/1976 | Morawetz et al. | 528/272 |
| 4,374,974 | 2/1983 | Hay | 528/219 |
| 4,798,883 | 1/1989 | Tung et al. | 528/272 |
| 4,963,644 | 10/1990 | Duh | 528/272 |

*Primary Examiner*—Samuel A. Acquah
*Attorney, Agent, or Firm*—Karen A. Harding; Harry J. Gwinnell

[57] ABSTRACT

A novel process has been developed for the crystallization of poly(ethylenenaphthalenedicarboxylate) (PEN) and its copolymers. The process comprises the step of maintaining the amount of water in said poly(ethylenenaphthalenedicarboxylate) below a critical moisture content ceiling throughout processing such that a separate drying step is not required.

20 Claims, No Drawings

PROCESS FOR CRYSTALLIZATION OF POLY (ETHYLENENAPHTHALENEDICARBOXYLATE)

SUMMARY OF THE INVENTION

A novel process has been developed for the crystallization of poly(ethylenenaphthalenedicarboxylate) (PEN) and its copolymers. Prior art required an extended drying time prior to PEN crystallization to avoid pellet sticking and/or shape deformation. This invention describes a process which does not require this extra drying step.

BACKGROUND OF THE INVENTION

Poly(ethylene 2,6-naphthalenedicarboxylate), referred to as PEN, is widely used as an extrusion and injection molding resin because of its good heat resistance, high glass transition temperature and gas barrier properties. PEN may be used in the fabrication of various articles for household or industrial uses including appliance parts, containers, automobile parts, films, and fibers.

PEN polymers prepared in conventional melt phase condensation polymerization reactions are generally pelletized by cutting strands of polymer under water. Such pellets are amorphous and are generally crystallized before processing. Further processing includes solid state polycondensation to increase the molecular weight of the polymer, film extrusion, fiber spinning, and injection molding into desired shapes or objects. Sticking or agglomeration may occur during these processing operations if the pellets are not crystallized.

Although most polyesters such as poly(ethylene terephthalate) are easy to dry at elevated temperatures prior to crystallization in batch dryers or other conventional continuous processing equipment, PEN pellets containing moisture or other volatile components tend to explode in a popcorn-like behavior when heated to elevated temperatures resulting in deformed and non-uniform pellet shapes which create materials handling problems.

One proposed solution to this problem for PEN is described in U.S. Pat. No. 4,963,644. This patent teaches that amorphous PEN pellets may be treated at 80° to 140° C. in the presence of a stream of an inert gas or under a vacuum to devolatilize the PEN pellets over a period of about 6 hours. Subsequently, the pellets are heated at 150°–260° C. to crystallize them. Although this process is effective, it is time consuming and therefore inefficient and expensive.

U.S. Pat. No. 4,798,883 does not address the drying problems associated with PEN but claims that PEN polymers containing small amounts of polyethylene glycol compounds crystallize more rapidly than unmodified PEN.

U.S. Pat. No. 4,374,974 describes the solid state polymerization of certain poly(ethylene terephthalate) homo- and copolyesters but does not disclose polyesters containing high levels of naphthalenedicarboxylic acid; nor does U.S. Pat. No. 4,374,974 address the problems associated with the drying of such polymers.

U.S. Pat. No. 3,960,817 describes a process for the solid phase polycondensation of thermoplastic polyesters. Although 2,6-naphthalenedicarboxylic acid is disclosed as a possible reactant, PEN and its attendant drying problems are not mentioned.

DESCRIPTION OF THE INVENTION

The present invention relates to a process comprising the steps of:

forming poly(ethylenenaphthalenedicarboxylate) pellets;

blowing an inert gas which is at approximately room temperature over said pellets;

maintaining the amount of water in said pellets below about 4200 ppm; and crystallizing said pellets by rapid heating to a crystallization temperature between about 190° C. and about 230° C.

It has been surprisingly found that when the foregoing process is used the PEN homo- and copolyesters formed thereby may be rapidly crystallized batch-wise or continuously without pausing for long periods of time at 30°–140° C. Typical batch temperature rates are in the range of 2°–20° C. per minute, preferably between about 2° and about 10° C. per minute, while continuous equipment operating at 190° to 230° C. will generally heat the pellets in about 10 minutes. If the pellets contain more than about 4200 ppm water, they tend to stick and/or explode and deform during rapid heating to the range of about 200° C. Preferably, pellets contain less than about 4000 ppm water.

Suitable polyesters for use in this invention generally contain at least 80 mol % of 2,6-naphthalene-dicarboxylic acid or one or more of its isomers and at least 80 mol % of ethylene glycol. Suitable naphthalenedicarboxylic acids include the 2,6-, 1,4-, 1,5-, 2,7-, 1,2-, 1,3-, 1,6-, 1,7, 1,8-, 2,3-, 2,4-, 2,5- and 2,8-naphthalenedicarboxylic acids or mixtures of two or more of these isomers. In addition to the naphthalenedicarboxylic acid component, the polymers may contain from 0 to about 20 mol % of other dibasic acids containing from about 4 to about 20 carbon atoms. Suitable modifying acids include terephthalic, isophthalic, succinic, glutaric, adipic, azelaic, sebacic, fumaric, stilbenedicarboxylic, 1,4-cyclohexanedicarboxylic, 1,3-cyclohexanedicarboxylic, sulfoisophthalic, sulfodibenzoic, diphenyldicarboxylic acid and the like. In addition to the ethylene glycol component, 0 to about 20 mol % of one or more modifying glycols containing from 3 to about 20 carbon atoms may be present. These modifying glycols may include propylene glycol, 1,3-propanediol, diethylene glycol, 1,4-butanediol, 1,6-hexanediol, 1,12-docecanediol, 2,2-dimethyl-1,3-propanediol, 2,2,4-trimethyl-1,3-propanediol, 2,2,4,4-tetramethyl-1,3-cyclobutanediol, 1,4-cyclohexanedimethanol, 1,3-cyclohexanedimethanol, 1,4-bis(hydroxyethoxy)-benzene, 4,4-bis(hydroxyethoxy-diphenyl), 4,4-bis(hydroxyethoxy) diphenyl ether, 2,6-bis(hydroxyethoxy)naphthalene and the like. Very small amounts of polyfunctional carboxylic acids and polyols containing at least 3 carboxylic and/or hydroxyl groups may also be used. Preferably the amount of the polyfunctional carboxylic acids and/or polyols does not exceed about 5 mol % and more preferably is between about 0.1 and about 1 mol%. Some useful ones include trimeric acid, pyromellitic acid, pyromellitic dianhydride, trimellitic acid, trimellitic anhydride, 1,2,3,4-benzenetetracarboxylic acid, glycerine, trimethylolpropane, pentaerythritol, 2-hydroxymethylterephthalic acid and the like. The polyesters of this invention are readily prepared using typical polycondensation reaction conditions well known in the art and disclosed in U.S. Pat. No. 3,960,817. They may be prepared from naphthalenedicarboxylic acid or its derivatives such as its dialkyl esters. The dimethyl esters are preferred. The polyesters may be prepared by either batch or continuous polymerization processes.

Typical polyesterification catalysts may be used. Suitable catalysts include, but are not limited to titanium alkoxides, dibutyl tin dilaurate, and combinations of zinc, manganese or magnesium acetates or benzoates with antimony oxide or antimony triacetate.

The temperature of the polymer at the end of the condensation reaction and just prior to discharge is generally greater than about 250° C., more preferably between about 280° C. and 300° C.

In the present process, PEN polyester prepared in a melt phase polycondensation is generally pelletized in an underwater cutter which utilizes water at approximately ambient temperature. The pellets are immediately blown dry with an inert gas to remove surface moisture. Inert gas is any gas which does not react or cause the absorption of water into the PEN pellets. Suitable gases include, but are not limited to partially or fully dehumidified air, argon and nitrogen.

It is desirable for handling reasons to cool the pellets as quickly as possible to less than about 50° C. Accordingly, the water and inert gas used during the pelletizing are generally approximately ambient temperature. Preferably the water and inert gas are no warmer than 45° C. more preferably between about 25° C. and about 30° C.

Once the surface water is separated from the pellets, the pellets are stored under conditions which prevent them from absorbing moisture. Polyesters typically exhibit some level of equilibrium moisture content at a given set of storage conditions. Storage conditions which maintain a level of moisture in the PEN below about 4000 ppm is acceptable. One such method is to seal the PEN in polyethylene bags or lined boxes.

Such pellets may be rapidly heated up to 200°–225° C. and crystallized without sticking or pellet explosion problems. The crystallization step is generally conducted in a vacuum or in the presence of an inert gas, typically nitrogen. Inert gas is any gas which does not react or cause the absorption of water into the PEN pellets. The pellets are crystallized either by introduction into a continuous crystallizing unit whereby the pellets will be heated in a matter of minutes, or by batch crystallization where the temperature ramp may require several hours depending on the size and type of processing unit. After this crystallization step, the pellets may be molded or extruded into various shapes and forms or submitted to solid phase polycondensation reactions to further increase the I.V. of the polymer.

Thus, it has been surprisingly found that by cooling with dehumidified air or inert gas and proper storage or packaging the additional drying step required by U.S. Pat. No. 4,963,644 may be eliminated.

In addition to the formation of pellets in an underwater pelletizer, pellets or granules may also be obtained by grinding chunks of polymer, underwater stranding into rods which are cut into pellets, extrusion into sheets which are diced into pellet form, or by other suitable means.

Polyesters prepared in the melt phase generally have inherent viscosity (I.V.) values in the 0.3 to 0.9 dl/g range. However, such melt phase prepared polymers may be further polymerized by well known solid phase polycondensation techniques to provide useful polymers having I.V. values in the 0.5 to about 1.2 dl/g range.

Other ingredients may be added to the compositions of this invention as desired to enhance the performance properties of the polyesters. For example, surface lubricants, denesting agents, stabilizers, antioxidants, ultraviolet light absorbing agents, mold release agents, metal deactivators, colorants including black iron oxide and carbon black, nucleating agents, phosphorus-containing stabilizers, zeolites, fillers and the like may be added.

The following examples further illustrate the invention.

EXAMPLE 1

Preparation of PEN

Dimethyl 2,6-naphthalenedicarboxylate (1.0 mole, 244.0 g), ethylene glycol (2.0 moles, 124.0 g), 75 ppm manganese (as manganese acetate tetrahydrate), 220 ppm antimony (as antimony oxide) were placed in a 1 liter polymerization reactor under a nitrogen atmosphere. The mixture was heated with stirring at 200° C. for 2 hours. The temperature was increased to 220° C. and maintained for 1 hour. At this point, 40 ppm phosphorus (as Merpol A) was added. Then, the temperature was increased to 290° C. over a 20 minute period. When the temperature reached 290° C., the nitrogen flow was stopped and vacuum was applied. The polymer was stirred under vacuum (0.1–0.3 mm Hg) for 50 minutes. The polymer was cooled under a nitrogen atmosphere and then granulated in a grinder. The I.V. of the sample was 0.56 dl/g as measured in a 60/40 phenol/tetrachloroethane solution.

EXAMPLE 2

Effect of Moisture Level on Drying of PEN

PEN pellets (nominal ⅛ in. pellets) were conditioned in a Blue M Model VP-100 AT-1 relative humidity chamber. This unit is capable of achieving 100% relative humidity at temperatures up to 75° C. The actual temperature and humidity in the chamber were measured continuously using an Omega Model RH-20C solid state humidity-temperature monitor. Inside the unit's controlled environment chamber, the PEN pellets were held in shallow aluminum pans. The pans contained only a small amount of sample so that a large percentage of the total surface area of each pellet was directly exposed to the chamber's atmosphere. Pellet samples were conditioned in the chamber using a variety of temperatures and humidities. Table 1 outlines the conditions used and the maximum length of storage for each sample. Pellets were removed from the chamber at convenient times and immediately sealed in dry vials until cool. After equilibration to room temperature, the samples were tested for first cycle glass transition temperature (Tg) and % moisture.

TABLE 1

| Sample Number | Temperature (°C.) | Relative Humidity (%) | Maximum Storage Time (hours) |
| --- | --- | --- | --- |
| 1 | 30–32 | 58–60 | 144 |
| 2 | 42–48 | 58–60 | 120 |
| 3 | 42–48 | 78–82 | 412 |
| 4 | 61–66 | 78–82 | 96 |

Water level determinations were made using a Mitsubishi CA-06 moisture analyzer equipped with a VA-06 Vaporizer module. The analyzer's vaporizer compartment temperature was maintained at 250° C. and the sample was conditioned prior to introduction of the PEN pellets. Sample size was controlled so that 8–12 minutes of titration time were required. At least two moisture determinations were made for each sample and the results were averaged.

First cycle Tg values were measured using a Perkin Elmer Model 7 Differential Scanning Calorimeter (DSC) using a heating rate of 20 degrees per minute up to 160° C.

In addition to moisture and glass transition temperature determinations, a portion of each sample was crystallized in a Teflon lined "boat" which was inserted into a temperature controlled heatblock maintained at 220° C. After 25 minutes, the samples were removed and permitted to cool slowly to room temperature. The crystallized pellets were examined visually to assess the degree of sticking, popcorn formation and/or deformation (if any) that had resulted from the crystallization process. The results obtained are summarized in Tables 2–5.

It is evident that samples containing less than 4000 ppm moisture show no sticking or popcorn formation. Samples containing greater than 4230 ppm moisture do show sticking and popcorn formation tendencies when heated rapidly up to drying and crystallization temperatures.

TABLE 2

MOISTURE MEASUREMENT RESULTS
Storage Temperature: 30° C.
Storage Relative Humidity: 60%

Moisture Level Data

| Aging Time (Hours) | No. of Samples | Mean (ppm) | Std. Dev. (ppm) | Tg (°C.) | Sticking ? (yes/no) |
|---|---|---|---|---|---|
| 0 | 3 | 310 | 10.60 | 125 | No |
| 1.5 | 1 | 744 | — | | No |
| 3 | 4 | 1327 | 346.89 | | No |
| 6 | 3 | 1486 | 138.75 | | No |
| 24 | 2 | 2261 | 69.30 | 120 | No |
| 48 | 2 | 2839 | 2.12 | | No |
| 72 | 3 | 3322 | 124.56 | 121 | No |
| 96 | 4 | 3424 | 245.84 | 121 | No |
| 132 | 4 | 4230 | 94.72 | 120 | Yes |
| 168 | 3 | 4971 | 99.29 | 120 (119) | Yes |

TABLE 3

MOISTURE MEASUREMENT RESULTS
Storage temperature: 45° C.
Storage Relative Humidity: 60%

Moisture Level Data

| Aging Time (Hours) | No. of Samples | Mean (ppm) | Std. Dev. (ppm) | Tg (°C.) | Sticking ? (yes/no) |
|---|---|---|---|---|---|
| 2 | 2 | 920 | 3.54 | | No |
| 4 | | | | | |
| 6 | 2 | 1637 | 32.53 | | No |
| 24 | 3 | 2427 | 224.55 | 121 | No |
| 48 | 2 | 3326 | 4.24 | 118 | No |
| 72 | 4 | 3626 | 141.86 | | No |
| 96 | 4 | 3732 | 106.93 | 121 | No |
| 120 | 5 | 4270 | 137.90 | 120 | Yes |

TABLE 4

MOISTURE MEASUREMENT RESULTS
Storage Temperature: 45° C.
Storage Relative Humidity: 81%

Moisture Level Data

| Aging Time (Hours) | No. of Samples | Mean (ppm) | Std. Dev. (ppm) | Tg (°C.) | Sticking ? (yes/no) |
|---|---|---|---|---|---|
| 2 | 2 | 1259 | 39.6 | | No |
| 6 | 1 | 2215 | — | 122 | No |
| 24 | 2 | 3800 | 182.43 | 118 | No |
| 32 | 2 | 3963 | 147.79 | | No |
| 48 | 3 | 4940 | 122.33 | 120 | Yes |
| 72 | 2 | 5269 | 98.99 | 118 | Yes |
| 96 | 2 | 5456 | 89.80 | 118 | Yes |
| 333 | 5 | 6724 | 551.2 | | Yes |
| 412 | 4 | 6415 | 302.4 | | Yes |

TABLE 5

MOISTURE MEASUREMENT RESULTS
Storage Temperature: 63° C.
Storage Relative Humidity: 81%

Moisture Level Data

| Aging Time (Hours) | No. of Samples | Mean (ppm) | Std. Dev. (ppm) | Tg (°C.) | Sticking ? (yes/no) |
|---|---|---|---|---|---|
| 1 | 3 | 1605 | 19.00 | 122 | No |
| 2 | 2 | 1994 | 12.73 | 120 | No |
| 3 | 2 | 2073 | 14.85 | 118 | No |
| 6 | 2 | 3229 | 220.62 | 120 | No |
| 18 | 2 | 4880 | 43.13 | 117 | Yes |
| 24 | 2 | 5505 | 76.37 | 118 | Yes |
| 42 | 2 | 5936 | 140.71 | 116 | Yes |
| 48 | 2 | 6076 | 97.58 | | Yes |
| 66 | 3 | 5992 | 213.92 | | Yes |
| 72 | 2 | 6724 | 72.83 | | Yes |
| 90 | 2 | 6485 | 35.36 | 116 | Yes |

EXAMPLE 3

PEN Copolyester containing 5 mol % 2,7-naphthalenedicarboxylic acid

A copolyester was prepared using 0.95 moles of dimethyl 2,6-naphthalenedicarboxylate, 0.05 moles of dimethyl 2,7-naphthalenedicarboxylate, and excess ethylene glycol in the presence of 200 ppm antimony (as antimony oxide) and 65 ppm manganese (as manganese acetate) using the general procedure of Example 1. This copolyester had an I.V. of 0.64. Samples of this copolyester containing 4000 ppm water did not stick when heated rapidly up to 220° C. for drying and crystallization purposes.

Similarly good results are achieved using PEN copolyester containing 5 mol % 1,4-cyclohexane-dimethanol, PEN copolyester containing 10 mol % terephthalic acid, or PEN copolyester containing 20 mol % 1,4-butanediol.

EXAMPLE 4

Solid Phase Polycondensation of PEN

PEN granules (I.V. 0.56) prepared as described in Example 1 which contain 3850 ppm water were placed in a fluidized bed column and rapidly (within 15 minutes) heated to 230° C. with dry nitrogen gas passing through the column. The procedure was continued for 12 hours. The particles remain as discrete particles with no evidence of sticking or "popcorn" formation and the final I.V. of the polymer is 0.89.

EXAMPLE 5

Commercial PEN Production and Crystallization

PEN was produced batchwise in a similar procedure as described in Example 1. Typical batch sizes range from 2500 to 5500 lbs. Upon discharge from the reactor, the polymer was extruded into rods upon which a water spray was used for cooling. The rods were then chopped using an underwater cutter (Automatik brand). Once the pellets were formed, convey water was used to transport the pellets to a dryer where both forced air and the temperature of the pellets were used to remove surface moisture. The "dry" or dewatered pellets were then immediately packaged in containers lined with polyethylene. Typical PEN pellet moisture levels were 10–20 ppm. The containers were sealed such that no further exposure to ambient moisture is allowed. Further crystallization processing was performed at 200° C. in batch tumble dryers (Patterson brand) without a drying stage required to prevent pellet sticking or pellet deformation.

We claim:

1. A process comprising the steps of:
   forming poly(ethylenenaphthalenedicarboxylate) pellets;
   blowing an inert gas which is at approximately room temperature over said pellets to maintain a moisture level of below about 4200 ppm in said pellets without any further drying step;
   maintaining the moisture level in said pellets below about 4200 ppm; and
   crystallizing said pellets by rapid heating to a crystallization temperature between about 190° C. and about 230° C., wherein said rapid heating does not include an additional drying step.

2. The process of claim 1 wherein said inert gas is any gas which does not react or cause the absorption of water into the PEN pellets at conditions present during said blowing step.

3. The process of claim 2 wherein said inert gas is selected from the group consisting of dehumidified air, argon or nitrogen.

4. The process of claim 1 wherein said crystallizing is conducted batch-wise and said rapid heating is conducted at a rate of at least about 2° C. per minute.

5. The process of claim 4 wherein said rate is between about 2° and about 10° C. per minute.

6. The process of claim 1 wherein said crystallizing is conducted continuously and said rapid heating is conducted over less than about 10 minutes.

7. The process of claim 1 wherein said poly (ethylenenaphthalenedicarboxylate) comprises at least 80 mol % 2,6-naphthalene-dicarboxylic acid or one or more of its isomers and at least 80 mol % of ethylene glycol.

8. The process of claim 8 wherein said isomers are selected from the group consisting of 1,4-, 1,5-, 2,7-, 1,2-, 1,3-, 1,6-, 1,7, 1,8-, 2,3-, 2,4-, 2,5-, 2,8- naphthalenedicarboxylic acids or mixtures thereof.

9. The process of claim 7 wherein said poly (ethylenenaphthalenedicarboxylate) further comprises from about 0 to about 20 mol % one or more dibasic acids containing from about 4 to about 20 carbon atoms.

10. The process of claim 9 wherein said dibasic acid is selected from the group consisting of terephthalic, isophthalic, succinic, glutaric, adipic, azelaic, sebacic, fumaric, stilbenedicarboxylic, 1,4-cyclohexanedicarboxylic, 1,3-cyclohexanedicarboxylic, sulfoisophthalic, sulfodibenzoic, diphenyldicarboxylic acid and mixtures thereof.

11. The process of claim 7 wherein said poly (ethylenenaphthalenedicarboxylate) further comprises 0 to about 20 mol % of one or more modifying glycols containing from 3 to about 20 carbon atoms.

12. The process of claim 11 wherein said modifying glycol is selected from the group consisting of propylene glycol, 1,3-propanediol, diethylene glycol, 1,4-butanediol, 1,6-hexanediol, 1,12-docecanediol, 2,2-dimethyl-1,3-propanediol, 2,2,4trimethyl-1,3-propanediol, 2,2,4,4-tetramethyl-1,3-cyclobutanediol, 1,4-cyclohexanedimethanol, 1,3-cyclohexanedimethanol, 1,4-bis(hydroxyethoxy)-benzene, 4,4'-bis(hydroxyethoxydiphenyl), 4,4'-bis(hydroxyethoxy) diphenyl ether, 2,6-bis (hydroxyethoxy)naphthalene and mixtures thereof.

13. The process of claim 1 wherein said amount of water is less than about 4000 ppm.

14. A process for the crystallization of poly (ethylenenaphthalenedicarboxylate) comprising the steps of maintaining amount of water in said poly (ethylenenaphthalenedicarboxylate) below a critical moisture content ceiling throughout processing without any further drying step; and crystallizing said pellets by rapid heating to a crystallization temperature, wherein said rapid heating does not include an additional drying step.

15. The process of claim 14 wherein said critical moisture content ceiling is about 4200 ppm.

16. The process of claim 14 wherein said critical moisture content ceiling is about 4000 ppm.

17. The process of claim 14 wherein said poly (ethylenenaphthalenedicarboxylate) further comprises from about 0 to about 20 mol % one or more dibasic acids containing from about 4 to about 20 carbon atoms.

18. The process of claim 17 wherein said dibasic acid is selected from the group consisting of terephthalic, isophthalic, succinic, glutaric, adipic, azelaic, sebacic, fumaric, stilbenedicarboxylic, 1,4-cyclohexanedicarboxylic, 1,3-cyclohexanedicarboxylic, sulfoisophthalic, sulfodibenzoic, diphenyldicarboxylic acid and mixtures thereof.

19. The process of claim 14 wherein said poly (ethylenenaphthalenedicarboxylate) further comprises 0 to about 20 mol % of one or more modifying glycols containing from 3 to about 20 carbon atoms.

20. The process of claim 19 wherein said modifying glycol is selected from the group consisting of propylene glycol, 1,3-propanediol, diethylene glycol, 1,4-butanediol, 1,6-hexanediol, 1,12-docecanediol, 2,2-dimethyl-1,3-propanediol, 2,2,4-trimethyl- 1,3-propanediol, 2,2,4,4-tetramethyl-1,3-cyclobutanediol, 1,4-cyclohexanedimethanol, 1,3-cyclohexanedimethanol, 1,4-bis(hydroxyethoxy)-benzene, 4,4'-bis(hydroxyethoxydiphenyl), 4,4'-bis(hydroxyethoxy) diphenyl ether, 2,6-bis (hydroxyethoxy) naphthalene and mixtures thereof.

* * * * *